Dec. 14, 1954 J. BLUE 2,696,785
METERING PUMP FOR LIQUID ANHYDROUS AMMONIA OR OTHER LIQUIDS
Filed March 11, 1949 6 Sheets-Sheet 1

Fig. 1.

Inventor:
John Blue,
By Cushman, Darby & Cushman
ATTORNEYS

United States Patent Office 2,696,785
Patented Dec. 14, 1954

2,696,785

METERING PUMP FOR LIQUID ANHYDROUS AMMONIA OR OTHER LIQUIDS

John Blue, Huntsville, Ala., assignor to John Blue Company, Huntsville, Ala., a corporation of Alabama Application March 11, 1949, Serial No. 80,957

21 Claims. (Cl. 103—11)

The present invention relates to apparatus for distributing liquids and, more particularly, relates to a metering pump for distributing anhydrous ammonia and other similar liquids useful in agriculture to the soil in amounts varying with the speed of the vehicle to which the apparatus is attached.

In the large scale application of liquid fertilizers, weed killers and insecticides, one of the major disadvantages has been the absence of any accurate, adjustable and dependable metering apparatus. The devices which have been employed in the past have consisted principally of pressure regulators and flow meters mounted upon a tractor along with other necessary accessories such as, for example, fluid supply tanks and fluid applicators. The latter generally consist of narrow curved plows, each of which is provided with a tubular member welded onto its rear side through which the fluid may be injected into the soil. The plows serve the dual purpose of carrying the liquid tubes while at the same time, furrowing the soil to receive the liquid. Under the usual operation, the liquid is injected into the soil at a depth of from four to eight inches and the furrows promptly filled in order to prevent the escape of the liquid.

A marked disadvantage of the pressure regulators and flow meters hitherto employed is that the quantity of liquid distributed is not proportional to the tractor speed, and since the speed of the tractor must necessarily vary, uneven distribution and waste of the liquid occur.

Furthermore, in such devices, the rate of flow is usually adjusted by means of an extremely sensitive needle valve which is easily affected by minute particles of foreign matter. A further disadvantage is the difficulty of reading and maintaining adjustment of these devices due to the numerous vibrations and jolts which occur during operation. In addition, most flow meters consist essentially of calibrated glass tubes within which a piston is housed and the bursting of the tube is not only a frequent but dangerous operating hazard.

Accordingly, it is an object of the present invention to provide an apparatus for applying to the soil liquid anhydrous ammonia or other liquids suitable for use in agriculture in which the disadvantages described above are overcome.

Furthermore, it is an object of the present invention to provide a positive displacement metering pump which delivers liquid in amounts varying in proportion to the speed of the vehicle to which the apparatus is attached.

It is a further object of this invention to provide a metering pump which may be adjusted to deliver a variable quantity of liquid at any particular speed of the vehicle.

A further object is to provide a metering pump which is substantially leak-proof and operates with a minimum requirement of power entirely independent of the supply tank pressure which is subject to extreme variation due to temperature changes.

A still further object of the invention is to provide a metering pump for liquid anhydrous ammonia and the like wherein the accuracy of liquid flow is not effected by vibration, foreign matter and lack of observation on the part of the operator.

Another object of this invention is to provide a metering pump with means for lowering the temperature of the liquid entering the pump in order to condense any gas bubbles which, if left in the system, would render an accurate metering of the liquid impossible.

Still another object of this invention is to provide a metering pump with means therein for purging any gas which may form in the system when the pump is not in operation.

These and other objects will appear more clearly from the accompanying drawings in which.

Figure 1:
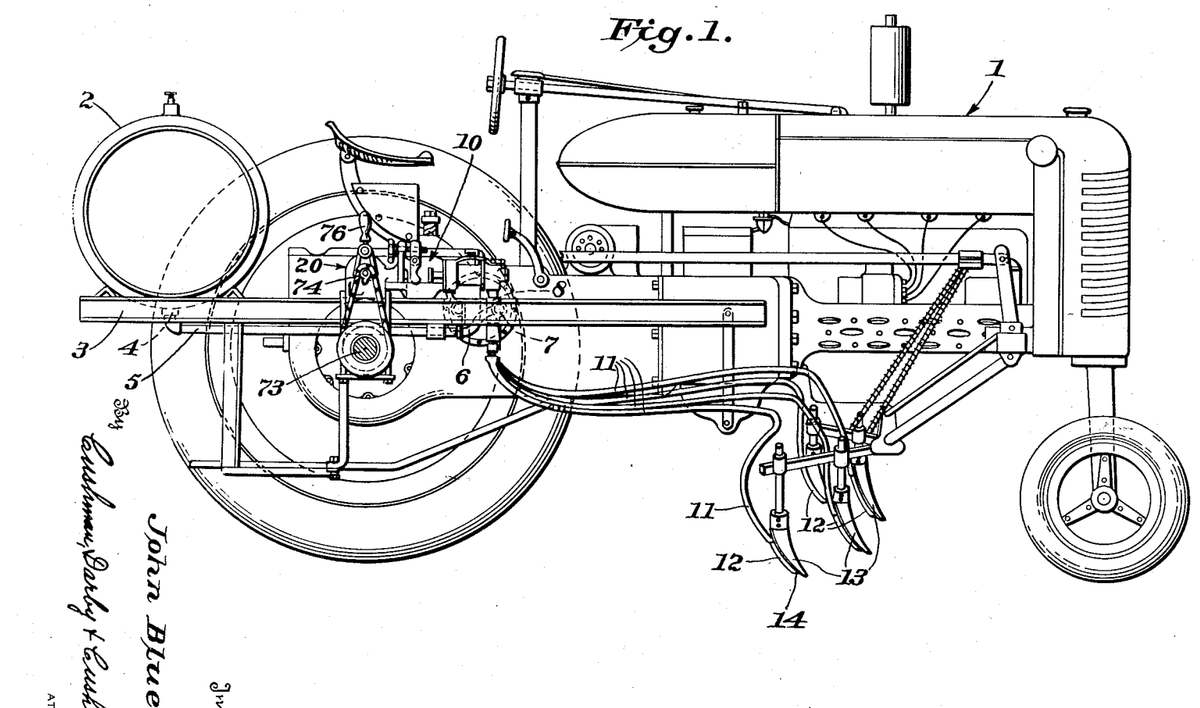
Figure 1 represents a perspective view of the metering pump as applied to a conventional garden tractor.
Figure 2:
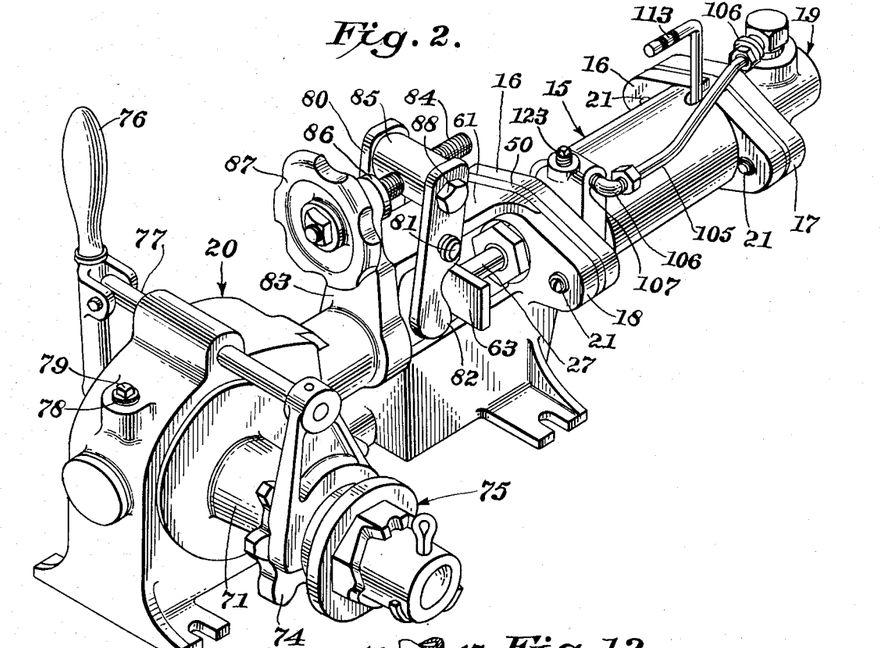
Figure 2 represents a perspective view of the metering pump.
Figure 12:
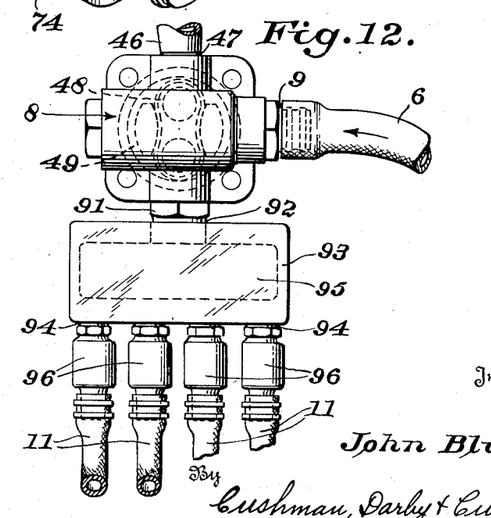
Figure 12 represents a front elevation of the heat exchanger showing the conduits which lead to the applicators.

Referring now to the drawings for a more complete understanding of the invention, a conventional garden tractor 1 is shown in Figure 1. A liquid reservoir or supply tank 2 is supported at the rear of the tractor by suitable braces 3 which are fixed to the tractor body in any suitable manner. The supply tank is provided on its underside with a liquid outlet 4 into which the pipe 5 is fitted. Pipe 5 is joined to a flexible conduit 6, which in turn, is connected to the threaded supply inlet 7 of the heat exchanger 8 by means of the coupling 9 (see Figures 11 and 12). The purpose of the heat exchanger is to lower the temperature of the liquid thus condensing any gas bubbles which may have been formed, the cooled liquid being supplied to the metering pump 10, which is also supported upon the braces 3.

A detailed description of the metering pump appears in a later part of this specification, thus at present, it is sufficient to say that liquid discharged from the pump is supplied to the soil through the conduits 11 and the liquid tubes 12, the latter being welded in the usual manner to the applicator blades or plows 13 and being provided with the outlet openings 14 for injecting the liquid into furrows formed by the plows.

Referring now to Figures 2 through 5 for a detailed description of the metering pump 10, the numeral 15 designates a cylinder block having the flanged ends 16 to which the similarly flanged ends 17 and 18 of the valve discharge housing 19 and the rear unit 20, respectively, are fixed by means of the bolts 21.

The cylinder block is provided with a bore 22 (see Figures 3 and 4), a portion of which receives the liner 23 to form the cylinder 24. The piston 25 is slidably mounted within cylinder 24 and is threadably secured as at 26 to the piston rod 27. The latter is positioned to be pushed inwardly into the cylinder at a rate dependent on the speed of the tractor, as will be later described, to create a pumping effect on liquid admitted to the cylinder from the heat exchanger through the cylinder inlet 28.

Figures 3, 11:
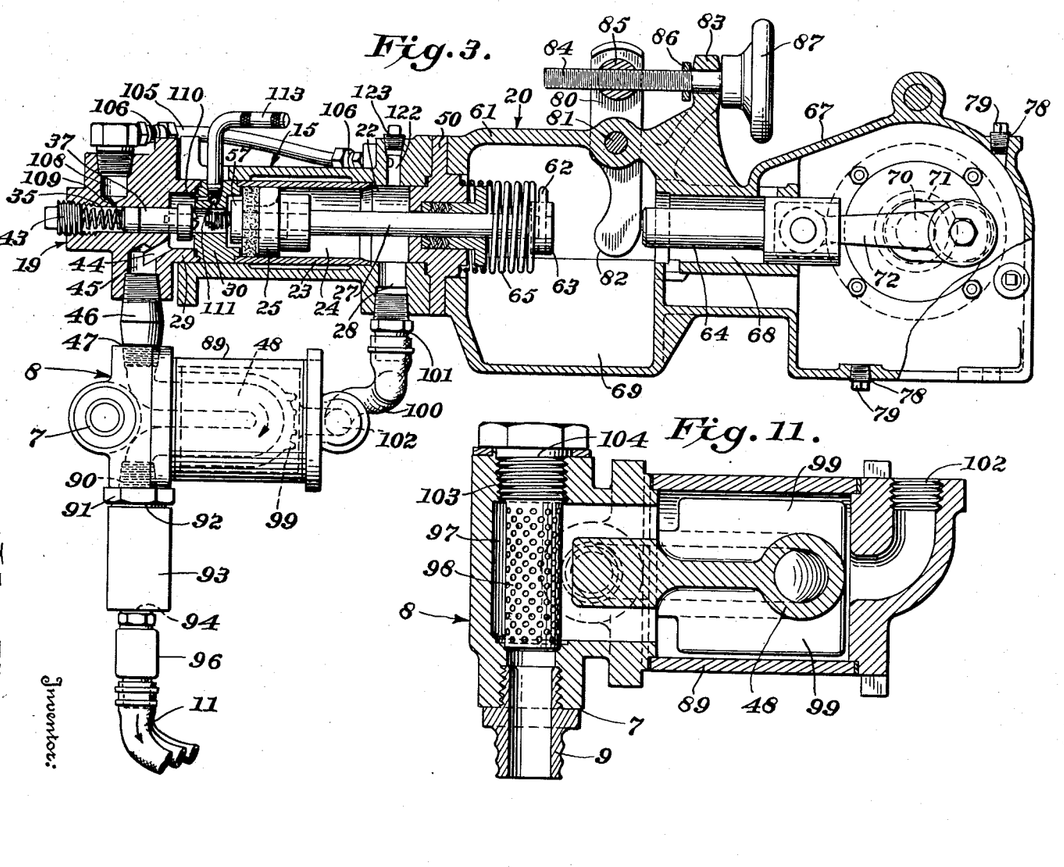
Figure 3 represents a side elevation partly in section of the metering pump.
Figure 11 represents a sectional view of the heat exchanger on the line 11—11 of Figure 6.
Figures 4, 5:
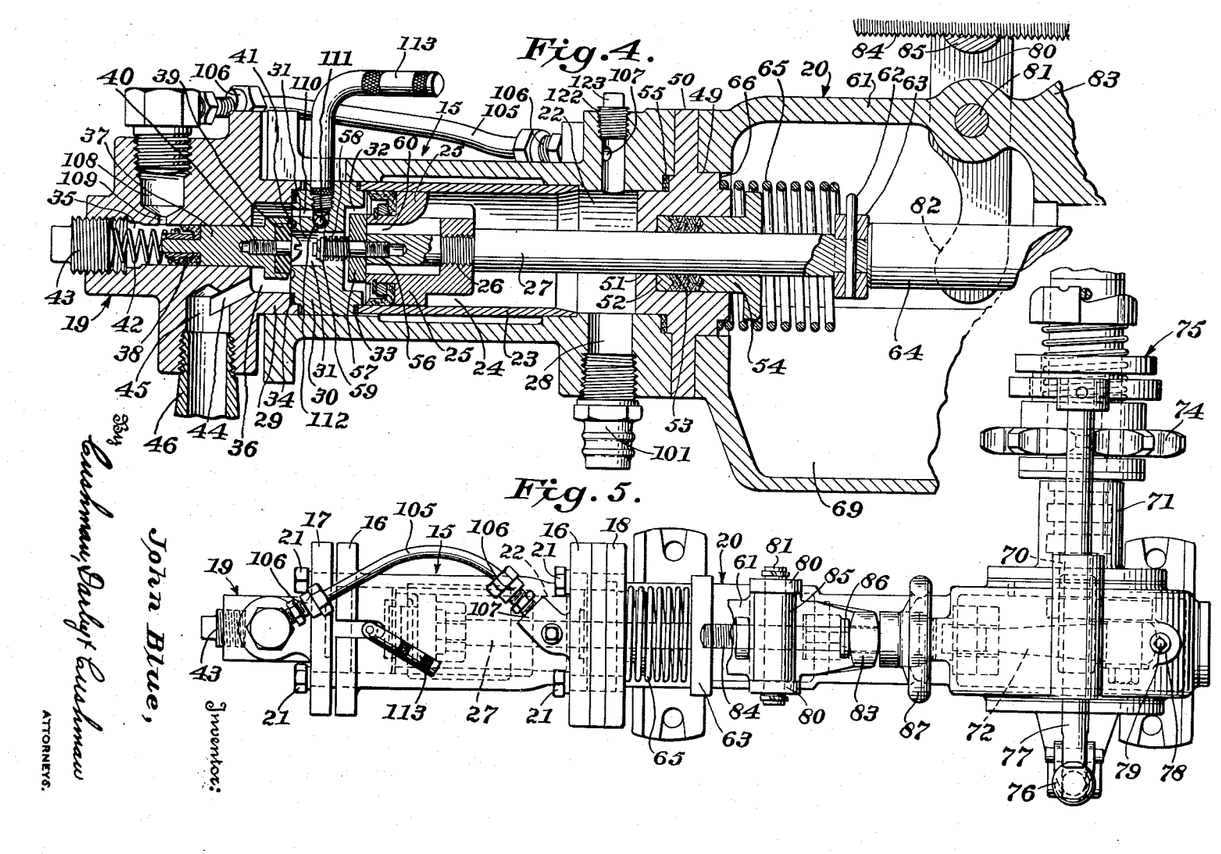
Figure 4 represents an enlarged fragmental sectional view of the metering pump.
Figure 5 represents a top plan view of the metering pump with several parts omitted for clarity.
Figure 6:
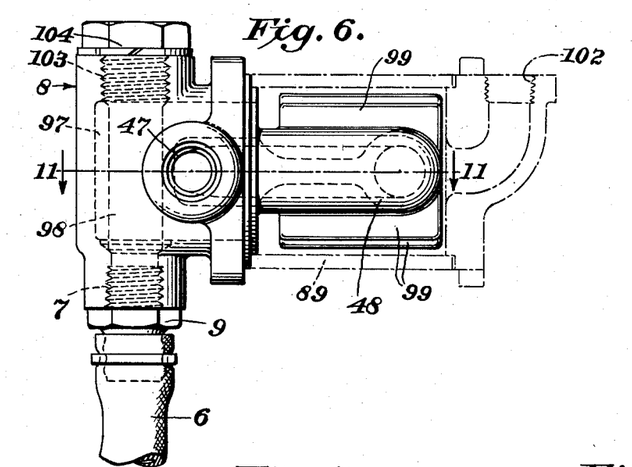
Figure 6 represents a top plan view of the heat exchanger.
Figure 7:
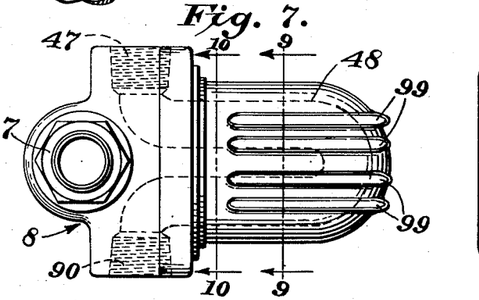
Figure 7 represents a side view of the heat exchanger shown in Figure 6.
Figure 8:
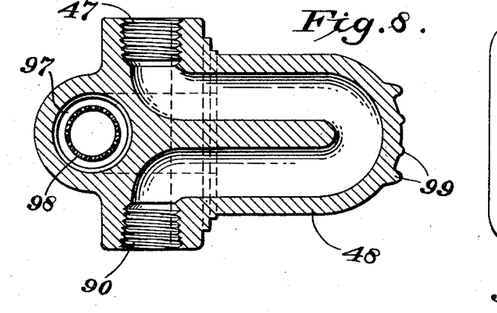
Figure 8 represents a vertical sectional view of the heat exchanger shown in Figure 7.
Figure 9:
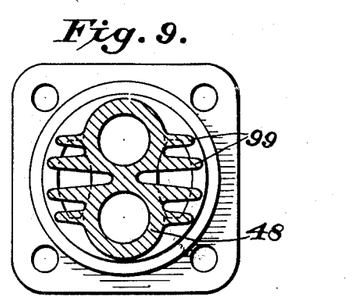
Figure 9 represents a sectional view of the heat exchanger on the line 9—9 of Figure 7.
Figure 10:
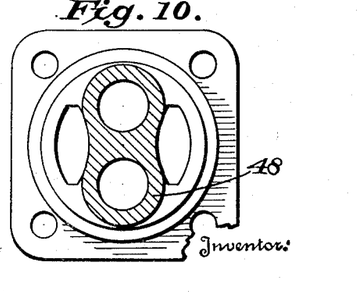
Figure 10 represents a sectional view of the heat exchanger on the line 10—10 of Figure 7.

As shown in Figures 3 and 4, the discharge valve housing 19 is provided with the bossed portion 29 which fits into the open end of the bore 22. Snugly received within the bore between liner 23 and bossed portion 29 is the valve block 30. This member is bored to provide the cylinder with an outlet 31, the latter being somewhat enlarged on the cylinder side of the block, as shown by the numeral 32. In order to prevent escape of fluid along the walls of the bore 22, a soft rubber gasket 33 is compressed between valve block 30 and liner 23. For similar reasons, another rubber gasket 34 is placed between the bossed portion 29 and valve block 30, the gasket in this instance being relatively thin for reasons which will become obvious from the following description.

The discharge valve housing is further provided with the central bore 35 which is enlarged at its innermost end to form the liquid discharge chamber 36, the bore 35 being axially aligned with fluid outlet 31 of the valve block. Slidably mounted within bore 35 and extending into the discharge chamber is the piston valve 37, carrying on its outer end a piston cup 38 of conventional construction to prevent leakage into the bore and having the disc valve 39 of rubber or other suitable composition fixed to its inner end by the bolt 40. Disc valve 39 is normally maintained firmly against the valve seat 41 of valve block 30 by the action of a spring 42 compressed between the bore plug 43 and the outer end of the piston valve. It is for this reason that the gasket 34 must be relatively thin since maintaining accurate alignment of the valve and valve seat would otherwise be extremely difficult.

Located on the bottom surface of the housing 19 and communicating with discharge chamber 36 through the port 44 is the threaded discharge outlet 45. The latter is connected by coupling 46 to the threaded inlet 47 of the heat exchanger expansion coil 48 so that fluid discharged from the pump may be passed through the heat exchanger to cool liquid from the supply tank. The reduction in pressure of the pumped liquid as it is discharged through the outlet valve permits it to expand and boil with resulting cooling or refrigerating effect. Hence, the heat exchanger 8 serves to condense any gas bubbles that may have formed in the supply line from the tank 2 and, thus, to insure that only liquid is supplied to the pump. Accurate metering would not be possible if the fluid being pumped contained a variable quantity of gas.

Fitted snugly into the open end of the cylinder block bore 22 and the circular opening 49 in end wall 18 of the rear unit is the plate member 50 which slidably supports piston rod 27 in the opening 51, the latter being cut away as at 52 to form a seat for suitable packing 53 and nut 54. The packing 55 is also placed between the plate member and cylinder block to prevent fluid leakage.

Threadedly secured to the end of the rod which extends into cylinder 24 is a bolt 56 upon which a check valve 57 of rubber or other appropriate material is loosely mounted. Spring 58 which is compressed between the check valve and the bolt head 59 lightly urges the former against the ports 60 of the piston, the pressure exerted by the spring being so slight that for all practical purposes liquid may flow freely from cylinder 24 through ports 60 except during the pumping stroke when valve 57 is firmly held against piston 25.

The other end of the piston rod lies directly beneath the bridge member 61 of the rear unit. Attached to this end of the rod by means of the key 62 is the crossbeam 63 which is adapted to be intermittently pushed inwardly by reciprocation of the crosshead assembly 64 thus creating a pumping effect within the cylinder. After the pumping stroke, the crossbeam is returned into position to be pushed again by the crosshead 64 through the action of a compression spring 65 placed between crossbeam 63 and the annular seat 66 of plate member 50. When pumping liquid ammonia the spring 65 is not necessary since the high pressure of the liquid itself forces the rod and crossbeam to return. However, for pumping liquids which are normally maintained at atmospheric pressure spring 65 must be utilized to return the rod and crossbeam to the desired position.

The crosshead assembly 64 which intermittently contacts crossbeam 63 to produce the pumping stroke within the cylinder is mounted in rear unit 20. The latter is principally comprised of the crankcase 67, the cylindrical bore 68 within which the crosshead assembly is slidably supported and the hollow supporting portion 69 which is partially cut away at the sides to form the bridge member 61 mentioned above.

The crankshaft 70 which extends through the housing 71 into crankcase 67 is pivotally joined to the crosshead assembly 64 by means of the connecting rod 72. In order to reciprocate the crosshead assembly at a rate dependent upon the tractor speed, crankshaft 70 is connected to the tractor axle 73 by the chain and sprocket arrangement 74, (see Figure 1). A suitable clutch mechanism 75 operable by the handle 76 and connecting rod 77 is also provided in order that the crankshaft may be disconnected from the tractor axle when it is necessary to discontinue pumping while the tractor is in motion. For supplying the interior of the crankcase with a suitable amount of oil, an opening 78 closed by the screw plug 79 is provided in the top surface of the crankcase while a similar opening is also provided in its bottom surface for draining purposes.

For adjusting the stroke of piston rod 27 and thus providing means for varying the pump output at any particular tractor speed, a pair of lever arms 80 are pivotally fixed to bridge member 61 by the pin 81. The rounded lower ends 82 of these lever arms are positioned to allow the crosshead assembly to pass between them and are adjustable to contact the crossbeam 63 at any desired position. The adjustment of the end is made possible by providing the rear unit with an upstanding portion 83 for supporting one end of an adjusting screw 84, the other end of the screw extending through the sleeve 85 which joins the upper ends of the lever arms. By providing the screw with the fixed nut 86, a turning of the screw by means of handle 87 causes the levers to pivot about pin 81 until the ends 82 contact the crossbeam 63 at a desired position, sleeve 85 being mounted free to turn upon the bolts 88 to prevent binding between the screw and sleeve.

The heat exchanger 8, which cools the liquid entering the pump, is of conventional construction comprised primarily of the expansion coil 48 and the casing 89 surrounding the coil. As previously described, inlet 47 of the expansion coil is joined to pump outlet 45, the liquid from the supply tank being cooled by expansion in coil 48 of liquid discharged from the pump. The outlet 90 of the expansion coil is joined by the coupling 91 to the inlet 92 of the manifold 93, the latter also being provided with a plurality of fluid outlets 94 communicating through fluid space 95 with its inlet 92. These manifold outlets are joined by means of couplings 96 to conduits 11 leading to the applicators 13, the couplings being provided with check valves, not shown, to prevent undesired backward flow of liquid.

Liquid to be cooled is supplied from the tank 2 to the interior 97 of the heat exchanger 8 by means of the supply inlet 7 mentioned above, the liquid first being passed through the screen 98 to remove any solid material which may be present and then being cooled by passing about the fins 99 of the expansion coil. The liquid within the expansion coil is discharged into the manifold and subsequently supplied to the soil, while the cooled liquid is admitted to the cylinder 24 by means of the flexible hose 100 joined by couplings 101 to the cylinder inlet 28 and heat exchanger supply outlet 102. For removing the screen 98 from within the heat exchanger, the latter is also provided with the opening 103 normally closed by plug 104.

Since the tank pressure is generally subject to extreme variation due to temperature changes, the pump must be operated entirely independently of the pressure within the tank. The desired result is attained by allowing the liquid pressure in the bore 35 to be equal to the pressure in cylinder 24. This is accomplished by means of a pressure equalizing conduit 105 which is joined by appropriate couplings 106 to the port 107 and the chamber 108 of the cylinder block and discharge housing, respectively, chamber 108 communicating with the bore 35 through passage 109. As best shown in Figure 4, passage or port 109 is preferably of considerably smaller cross-sectional area than the cross-sectional area of the chamber 108. Because of the good heat exchange relation between the chamber 108 and the expanded discharge from the pump, the chamber is cooled sufficiently to condense any gas that may have formed in passing through the conduit 105. Thus, when the pump is in operation liquid is always present in the bottom of the chamber 108 and the port 109 acts as a choke orifice to prevent chattering of the piston valve 37 on its seat 41. With this arrangement, the ability of piston valve 37 to keep liquid from leaking through cylinder outlet 31 is made entirely independent of tank pressure, yet, as piston 25 is pushed inwardly by the crosshead 64 only a slight effort is required to build up sufficient pressure to overcome the action of spring 42 to unseat the valve. Thus the pump operates not only with a minimum requirement of power but also entirely independently of supply tank pressure.

The pump is also provided with means for purging any gas which may have formed in the system. This is particularly important when liquid ammonia is employed for whenever the supply tank is filled with ammonia, the system tends to become filled with gas which should be purged before operation of the pump is begun. For this purpose, the valve block is provided with the bleed-off passage 110 communicating with both the housing liquid space 36 and cylinder 24 but normally kept closed by maintenance of the ball valve 111 on seat 112. Turning of the handle 113, however, allows the ball valve to rise off its seat, thus allowing gas to be purged from the system, the flow continuing until the cylinder is filled with liquid, the latter condition being evident when the heat exchanger 8 has begun to frost. Obviously, this purging also serves to start the function of the heat exchanger 8 to cool the liquid supplied to the pump.

The operation of the apparatus above described using liquid ammonia for illustrative purposes is as follows, it being clearly understood that other similar liquids useful in agriculture as insecticides, weed-killers and fertilizers may be employed equally as well.

Assuming the tractor to be moving, liquid ammonia from supply tank 2 is first passed into the heat exchanger 8 to be cooled in order to eliminate any gas bubbles which may have been formed. The necessary cooling effect being obtained by the expansion of ammonia discharged from the pump. The discharged ammonia begins to boil immediately after flowing past piston valve 37, since the pressure at this point is reduced almost to atmospheric pressure and continues to boil through the heat exchanger coil 48. The cooling liquid within the coil then flows into the manifold 93 from which it is subsequently distributed to the soil by means of the conduits 11 and applicators 13. The cooled liquid is supplied to cylinder 24 through inlet 28, the ammonia flowing easily through the ports 60 inasmuch as check valve 57 is urged only lightly against the piston.

Since the crankshaft 70 is driven by the tractor axle, the crosshead assembly 64 reciprocates within the rear unit at a rate dependent upon the speed of the tractor, the innermost end of the crosshead passing between the lever arms 80 to intermittently push piston rod 27 inwardly thus creating a pumping stroke within the cylinder 24. As the piston 25 moves inwardly, check valve 57 is held firmly against the piston ports thereby building up sufficient pressure to unseat piston valve 37, allowing ammonia to be discharged from the pump into the heat exchanger. As shown in Figure 4, the piston has just completed its pumping stroke, piston valve again being seated and the piston and crosshead assembly ready to begin the return stroke. As the crosshead returns, the crossbeam 64 remains in contact therewith due to the action on both sides of the piston of the high pressure liquid ammonia, check valve 57 again allowing liquid to flow through ports 60, with the liquid being kept in the cylinder by the piston valve due to the combined action of spring 42 and the equalized pressure in bore 35.

In the event less than full volume is desired, the stroke of the piston may be varied by adjusting lever arms 80 to contact the crossbeam at the position giving the desired volume of liquid ammonia.

It is, of course, obvious from the above that the faster the tractor is operated, the faster is the reciprocation of the piston within the cylinder and, consequently, the greater the amount of ammonia pumped out to the soil through the applicators. Furthermore, through adjustment of the lever arms, the delivery of the pump may be varied from zero volume to the maximum rating in an infinitely variable manner. In addition, by equalizing the liquid pressure on both sides of piston valve 37 the pump may be operated entirely independently of supply tank pressure.

Figure 13:
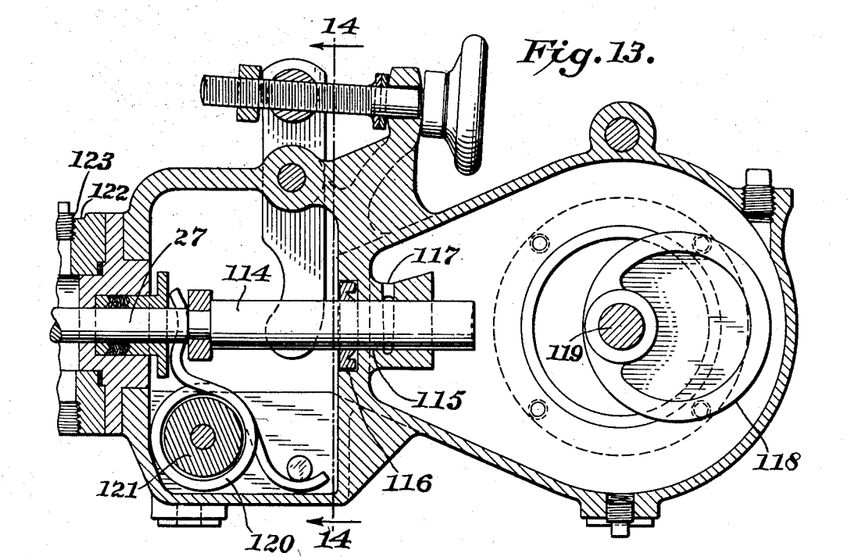
Figure 13 represents a sectional view of a modified form of driving mechanism for operating the metering pump; and, Figure 14 represents a sectional view on the line 14—14 of the modified form shown in Figure 13.
Figure 14:
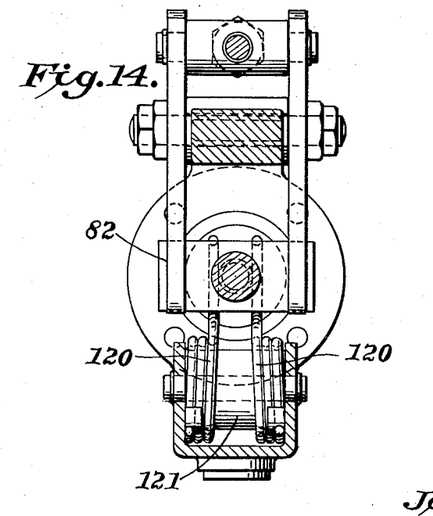

For reciprocating the piston within the cylinder at a rate dependent on the tractor speed, a modification such as that shown in Figures 13 and 14 may also be utilized.

In this form, although the means for adjusting the piston stroke and for rotating the shaft within the crankcase are the same as previously described, the piston rod 27 is provided with an extension 114 slidably supported in the restricted portion 115, the latter being provided with a suitable bearing 116 and a port 117 for receiving small quantities of oil. The end of the piston rod extension is so positioned as to be intermittently pushed inwardly by the cam 118 fixed to the end of the rotatable shaft 119, the rod being returned after the pumping stroke by means of coil springs 120 mounted on the member 121.

When employing the apparatus described above for distributing insecticides and weedkillers, the applicators should be replaced by suitable spray nozzles, and a slight suction applied to the pump since these materials are generally only under atmospheric pressure in the supply tank. In such instances, it is necessary to prime the pump, this being accomplished by providing the cylinder block with the opening 122 which is normally closed by the pipe plug 123.

It is obvious from the above description that the present invention provides an extremely versatile, inexpensive and practical metering pump for distributing liquid ammonia and similar liquids without the disadvantages previously encountered in such devices. Furthermore, our invention has the additional advantages of being completely free of expensive and complex mechanically operated valves, operates without leakage and independently of pressure within the supply tank, and requires a minimum amount of power.

It is to be understood that various changes in the shapes and materials employed can be made in the apparatus described above without deviating from the scope of this invention.

Having thus described my invention, what I claim as new is:

1. A metering pump for liquid distributing apparatus comprising a cylinder block having a fluid inlet, a discharge valve housing fixed to an end of said cylinder block, a cylinder within said block communicating with said fluid inlet and having a fluid outlet adjacent said discharge valve housing, valve means slidable in said discharge valve housing normally closing said fluid outlet, conduit means between said cylinder block and said discharge valve housing for equalizing the fluid pressure on both sides of said valve means, a piston slidable within said cylinder, and means for intermittently pushing said piston inwardly into said cylinder at a rate dependent on the speed of the vehicle to which said apparatus is attached to create a pumping stroke, the pressure created by said pumping stroke opening said fluid outlet to permit the discharge of fluid from within said cylinder, and means for purging gas formed in said apparatus.

2. A metering pump for liquid distributing apparatus comprising a cylinder block having a fluid inlet, a discharge valve housing fixed to an end of said cylinder block, a cylinder within said block communicating with said fluid inlet and having a fluid outlet adjacent said discharge valve housing, valve means slidable in said discharge valve housing normally closing said fluid outlet, conduit means between said cylinder block and said discharge valve housing for equalizing the fluid pressure on both sides of said valve means, a piston slidable within said cylinder, and means for intermittently pushing said piston inwardly into said cylinder at a rate dependent on the speed of the vehicle to which said apparatus is attached to create a pumping stroke, the pressure created by said pumping stroke opening said fluid outlet to permit the discharge of fluid from within said cylinder, and means for cooling the fluid entering said cylinder.

3. A metering pump for liquid distributing apparatus comprising a cylinder block having a fluid inlet, a discharge valve housing fixed to one end of said cylinder block, a cylinder within said cylinder block communicating with said fluid inlet and having a fluid outlet adjacent said discharge valve housing, valve means slidable in said discharge housing normally closing said fluid outlet, conduit means between said cylinder block and said discharge valve housing equalizing the fluid pressure on both sides of said valve means, a discharge outlet in said discharge valve housing communicating with said fluid outlet, a piston rod extending inwardly into said cylinder, a piston mounted on said piston rod slidable within said cylinder, driving means for intermittently pushing said piston rod inwardly into said cylinder at a rate dependent on the speed of the vehicle to which said apparatus is attached to create a pumping stroke within said cylinder, the increased fluid pressure created by said pumping stroke opening said fluid outlet and permitting discharge of fluid through said discharge outlet, and means for adjusting the stroke of said piston.

4. A metering pump for liquid distributing apparatus comprising a cylinder block having a fluid inlet, a discharge valve housing fixed to one end of said cylinder block, a rear unit fixed to the other end of said cylinder block, a cylinder within said cylinder block communicating with said fluid inlet and having a fluid outlet adjacent said discharge valve housing, valve means slidable in said discharge valve housing normally closing said fluid outlet, conduit means between said cylinder block and said discharge valve housing equalizing the fluid pressure on both sides of said valve means, a discharge outlet in said discharge valve housing communicating with said fluid outlet, a piston rod extending inwardly into said cylinder, a piston mounted on said piston rod slidable in said cylinder, a crossbeam fixed to said piston rod, driving means mounted in said rear unit for intermittently pushing said piston rod inwardly into said cylinder at a rate dependent on the speed of the vehicle to which said apparatus is attached to create a pumping stroke within said cylinder, the increased fluid pressure created by said pumping stroke opening said fluid outlet to permit discharge of fluid through said discharge outlet, and adjustable means mounted on said rear unit and cooperating with said crossbeam for varying the stroke of said piston.

5. A metering pump as claimed in claim 4, said adjustable means comprising a lever pivotally mounted on said rear unit adapted to contact said crossbeam, and screw means for adjusting said lever to a desired position.

6. A metering pump for liquid distributing apparatus comprising a cylinder block having a fluid inlet, a discharge valve housing fixed to one end of said cylinder block, a rear unit fixed to the other end of said cylinder block, a cylinder within said cylinder block communicating with said fluid inlet and having a fluid outlet adjacent said discharge valve housing, valve means slidable in said discharge valve housing normally closing said fluid outlet, conduit means between said cylinder block and said discharge valve housing equalizing the fluid pressure on both sides of said valve means, a discharge outlet in said discharge valve housing communicating with said fluid outlet, a piston rod extending inwardly into said cylinder, a piston mounted on said piston rod slidable in said cylinder, a crossbeam fixed to said piston rod, driving means mounted in said rear unit for intermittently pushing said piston rod inwardly into said cylinder at a rate dependent on the speed of the vehicle to which said apparatus is attached to create a pumping stroke within said cylinder, the increased fluid pressure created by said pumping stroke opening said fluid outlet to permit discharge of fluid through said discharge outlet, means communicating with said cylinder for purging gas formed in said apparatus, and adjustable means cooperating with said crossbeam for varying the stroke of said piston.

7. A metering pump for liquid distributing apparatus comprising a cylinder block having a fluid inlet, a discharge valve housing fixed to one end of said cylinder block, a rear unit fixed to the other end of said cylinder block, a cylinder within said cylinder block communicating with said fluid inlet and having a fluid outlet adjacent said discharge valve housing, valve means slidable in said discharge valve housing normally closing said fluid outlet, conduit means between said cylinder block and said discharge valve housing equalizing the fluid pressure on both sides of said valve means, a discharge outlet in said discharge valve housing communicating with said fluid outlet, a piston rod extending inwardly into said cylinder, a piston mounted on said piston rod slidable in said cylinder, a crossbeam fixed to said piston rod, driving means mounted in said rear unit for intermittently pushing said piston rod inwardly into said cylinder at a rate dependent on the speed of the vehicle to which said apparatus is attached to create a pumping stroke within said cylinder, the increased fluid pressure created by said pumping stroke opening said fluid outlet to permit discharge of fluid through said discharge outlet, means communicating with said cylinder for purging gas formed in said apparatus, a heat exchanger communicating with said fluid inlet and said discharge outlet for cooling the fluid entering said cylinder by expansion of discharged fluid, and adjustable means cooperating with said crossbeam for varying the stroke of said piston.

8. A metering pump for liquid distributing apparatus comprising a cylinder block having a fluid inlet, a discharge valve housing fixed to one end of said cylinder block, a rear unit fixed to the other end of said cylinder block, a cylinder within said cylinder block communicating with said fluid inlet, a valve block within said cylinder block between said discharge valve housing and said cylinder, said valve block having a passage therethrough providing a fluid outlet for said cylinder, a bore in said discharge valve housing, a piston valve slidable in said bore normally urged against said valve block to close said fluid outlet, a discharge outlet in said housing communicating with said fluid outlet, conduit means between said cylinder and said housing bore for equalizing the fluid pressure on both sides of said piston valve, a piston rod extending inwardly into said cylinder, a piston mounted on said piston rod slidable in said cylinder, a crossbeam fixed to said piston rod, driving means mounted in said rear unit for intermittently pushing said piston rod inwardly into said cylinder at a rate dependent on the speed of the vehicle to which said apparatus is attached to create a pumping stroke within said cylinder, the increased fluid pressure created by said pumping stroke forcing said piston valve away from said valve block to permit discharge of fluid through said discharge outlet, means communicating with said cylinder for purging gas formed in said apparatus, and means cooperating with said crossbeam for adjusting the stroke of said piston.

9. A metering pump for liquid distributing apparatus comprising a cylinder block having a fluid inlet, a bore in said cylinder block, a portion of said bore forming a cylinder, said cylinder communicating with said fluid inlet, a discharge valve housing fixed to one end of said cylinder block, a rear unit fixed to the other end of said cylinder block, a valve block within said bore between said discharge valve housing and said cylinder, said valve block having a passage therethrough providing a fluid outlet for said cylinder, a bore in said discharge valve housing, a piston valve slidable in said bore normally urged against said valve block to close said fluid outlet, a discharge outlet in said housing communicating with said fluid outlet, a conduit connecting said cylinder to said housing bore, a piston rod extending inwardly into said cylinder, a piston carried on said piston rod slidable within said cylinder between said fluid inlet and said fluid outlet, a port in said piston, a rotatable crankshaft within said rear unit, a crosshead assembly connected to said crankshaft for intermittently pushing said piston rod inwardly into said cylinder to create a pumping stroke, the pressure created by said pumping stroke forcing said piston valve away from said valve block to permit discharge of fluid from said discharge outlet, means for returning said piston rod after its pumping stroke, a check valve mounted on the inner end of said piston rod closing said piston port during said pumping stroke, a crossbeam fixed to said piston rod, a pair of lever arms pivotally mounted on said rear unit adapted to contact said crossbeam, a screw mounted on said rear unit for positioning said lever arms, a gas passage in said valve body communicating with said cylinder and said discharge outlet, valve means for closing said passage, and a heat exchanger connected to said discharge outlet and said fluid inlet for cooling the liquid entering said cylinder by expansion of the discharged fluid.

10. A metering pump for liquid distributing apparatus comprising a cylinder block having a fluid inlet, a bore in said cylinder block, a portion of said bore forming a cylinder, said cylinder communicating with said fluid inlet, a discharge valve housing fixed to one end of said cylinder block, a rear unit fixed to the other end of said cylinder block, a valve block within said bore between said discharge valve housing and said cylinder, said valve block having a passage therethrough providing a fluid outlet for said cylinder, a bore in said discharge valve housing, a piston valve slidable in said bore normally urged against said valve block to close said fluid outlet, a discharge outlet in said housing communicating with said fluid outlet, a conduit connecting said cylinder to said housing bore, a piston rod extending inwardly into said cylinder, a piston carried on said piston rod slidable within said cylinder between said fluid inlet and said fluid outlet, a port in said piston, a rotatable shaft within said rear unit, a cam mounted on said shaft for intermittently pushing said piston rod inwardly into said cylinder to create a pumping stroke, the pressure created by said pumping stroke forcing said piston valve away from said valve block to permit discharge of fluid from said discharge outlet, means for returning said piston rod after its pumping stroke, a check valve mounted on the inner end of said piston rod closing said piston port during said pumping stroke, a crossbeam fixed to said piston rod, a pair of lever arms pivotally mounted on said rear unit adapted to contact said crossbeam, a screw mounted on said rear unit for positioning said lever arms, a gas passage in said valve boy communicating with said cylinder and said discharge outlet, valve means for closing said passage, and a heat exchanger connected to said discharge outlet and said fluid inlet for cooling the liquid entering said cylinder by expansion of the discharged fluid.

11. Liquid distributing apparatus comprising a liquid supply tank, a metering pump, conduit means connecting said tank to said pump and means for conducting liquid from said pump to the soil, said metering pump comprising a cylinder block having a fluid inlet, a discharge valve housing fixed to one end of said cylinder block, a cylinder within said cylinder block communicating with said fluid inlet and having a fluid outlet adjacent said discharge valve housing, valve means slidable in said discharge valve housing normally closing said fluid outlet, conduit means between said cylinder block and said discharge valve housing equalizing the fluid pressure on both sides of said valve means, a discharge outlet in said discharge valve housing communicating with said fluid outlet, a piston rod extending inwardly into said cylinder, a piston mounted on said piston rod slidable within said cylinder, driving means for intermittently pushing said piston rod inwardly into said cylinder at a rate dependent on the speed of the vehicle to which said apparatus is attached to create a pumping stroke within said cylinder, the increased fluid pressure created by said pumping stroke opening said fluid outlet and permitting discharge of fluid through said discharge outlet, and means for adjusting the stroke of said piston.

12. Liquid distributing apparatus comprising a liquid supply tank, a metering pump, conduit means connecting said tank to said pump and means for conducting liquid from said pump to the soil, said metering pump comprising a cylinder block having a fluid inlet, a bore in said cylinder block, a portion of said bore forming a cylinder, said cylinder communicating with said fluid inlet, a discharge valve housing fixed to one end of said cylinder block, a rear unit fixed to the other end of said cylinder block, a valve block within said bore between said discharge valve housing and said cylinder, said valve block having a passage therethrough providing a fluid outlet for said cylinder, a bore in said discharge valve housing, a piston valve slidable in said bore normally urged against said valve block to close said fluid outlet, a discharge outlet in said housing communicating with said fluid outlet, a conduit connecting said cylinder to said housing bore, a piston rod extending inwardly into said cylinder, a piston carried on said piston rod slidable within said cylinder between said fluid inlet and said fluid outlet, a port in said piston, driving means mounted in said rear unit for intermittently pushing said piston rod inwardly into said cylinder to create a pumping stroke, the pressure created by said pumping stroke forcing said piston valve away from said valve block to permit discharge of fluid from said discharge outlet, means for returning said piston rod after its pumping stroke, a check valve mounted on the inner end of said piston rod closing said piston port during said pumping stroke, a crossbeam fixed to said to said piston rod, a pair of lever arms pivotally mounted on said rear unit adapted to contact said crossbeam, a screw mounted on said rear unit for positioning said lever arms, a gas passage in said valve body communicating with said cylinder and said discharge outlet, valve means for closing said passage, and a heat exchanger connected to said discharge outlet and said fluid inlet for cooling the liquid entering said cylinder by expansion of the discharged fluid.

13. A pump for accurately metering a pressurized normally-gaseous liquid comprising: means defining an expansible pumping chamber having an inlet and an outlet; an inlet check valve and an outlet check valve controlling said inlet and said outlet, respectively; means operable by fluid pressure for loading said outlet check valve independently of the discharge from said outlet; and conduit means for supplying said fluid pressure means with pressure fluid from the source of the pressurized liquid being pumped.

14. The structure defined in claim 13 including a choke orifice in said conduit means for preventing chattering of said outlet check valve on its seat.

15. The structure defined in claim 13 in which the conduit means includes means defining a condensing chamber adjacent the fluid pressure operable means and in heat exchange relation with the pumping chamber outlet, said condensing chamber having a choke orifice adjacent the bottom thereof for admitting pressurized liquid to said fluid-pressure operable means.

16. The structure defined in claim 13 in which the pressure affected area of the fluid pressure operable means is substantially equal to the area of the outlet check valve exposed to the pressure within the pumping chamber, whereby said valve is substantially pressure counterbalanced when no pumping pressure exists in said chamber.

17. The structure defined in claim 13 including manually-operable means for purging the pumping chamber to the outlet side of the outlet check valve.

18. The structure defined in claim 13 in which the pressure-affected area of the fluid pressure operable means is substantially equal to the area of the outlet check valve exposed to the pressure within the pumping chamber so that the pressure-developed forces acting to seat and unseat said valve are substantially counterbalanced when no pump pressure exists in said chamber, including resilient means additionally loading the outlet check valve.

19. In a system for accurately metering a pressurized normally-gaseous liquid being discharged to a lower pressure, the combination comprising: a source of pressurized normally-gaseous liquid; a positive displacement pump adapted to receive fluid from said source and to discharge said fluid to a lesser pressure; a heat exchanger; and connections between said pump and said heat exchanger for passing the fluid supplied to said pump in heat exchange relation with the fluid discharged therefrom.

20. The combination defined in claim 19 including manually-operable means for purging the pumping chamber of the pump to the discharge connection thereto.

21. The combination defined in claim 19 in which the pump has an inlet and an outlet each provided with a check valve for controlling the same, and including means operable by fluid pressure for loading said outlet check valve independently of the discharge from said outlet, and conduit means for supplying said fluid pressure operable means with pressure fluid from the pressurized source of the liquid being pumped.

References Cited in the file of this patent

UNITED STATES PATENTS

| Number | Name | Date |
|---|---|---|
| 569,883 | Ollard | Oct. 20, 1896 |
| 2,148,112 | Dillstrom | Feb. 21, 1939 |
| 2,286,928 | Pipkin, Jr. | June 16, 1942 |